United States Patent [19]

Chen et al.

[11] Patent Number: 5,324,439
[45] Date of Patent: Jun. 28, 1994

[54] PROCESS FOR THE RECOVERY OF METAL FROM CYANIDE-CONTAINING LIQUID WASTES

[75] Inventors: Shyh-Tsung Chen; Kun-Chung Wu, both of Hsinchu; Wen-Sen Chang, Miao-Li Shiann, all of Taiwan

[73] Assignee: Industrial Technology Research Institute, Hsinchu, Taiwan

[21] Appl. No.: 33,401

[22] Filed: Mar. 19, 1993

[51] Int. Cl.⁵ .............................. C02F 1/72; C02F 1/62
[52] U.S. Cl. .................................... 210/761; 210/904; 210/912; 423/42
[58] Field of Search ............... 210/904, 758, 763, 765, 210/761, 912; 423/42

[56] References Cited

U.S. PATENT DOCUMENTS

| | | | |
|---|---|---|---|
| 4,812,243 | 3/1989 | Brandenburg et al. | 210/904 |
| 4,853,136 | 8/1989 | Roussel et al. | 210/904 |
| 4,877,519 | 10/1989 | Robey | 210/904 |
| 5,106,508 | 4/1992 | Schwitzgebel | 210/904 |
| 5,120,453 | 6/1992 | Frame et al. | 210/904 |

*Primary Examiner*—Neil McCarthy
*Attorney, Agent, or Firm*—Darby & Darby

[57] ABSTRACT

The present invention is a process for oxidation of a liquid which contains cyanide and soluble metal ions, using an oxygen-containing gas. An example of such a liquid is the liquid waste produced during metal treatment processes. The disclosed process not only eliminates the cyanide completely, but also converts the metal dissolved in the liquid into granular metal oxides which can be readily recovered.

4 Claims, 1 Drawing Sheet

PROCESS FOR THE RECOVERY OF METAL FROM CYANIDE-CONTAINING LIQUID WASTES

SCOPE OF THE INVENTION

The invention relates to a process for the oxidation of cyanide-containing liquids, such as the liquid waste produced during metal treatments. This oxidation occurs through reaction of the liquid with an oxygen-containing gas, preferably air. The process of the present invention not only eliminates the cyanide from the liquid but also converts metals dissolved in the liquid into granular metal oxides which can be readily recovered from the oxidized effluent.

BACKGROUND OF THE INVENTION

Conventionally, research into the use of oxidation by an oxygen-containing gas for the treatment of liquid wastes containing cyanide focused on the elimination of the cyanide and did not include methods of recovering any dissolved metal from the oxidized waste. Using the conditions of the prior art, oxidation of the cyanide in solution by an oxygen-containing gas produced carbon dioxide and ammonium which would further react with dissolved metal ions present in the liquid to form metal ammonium complexes. Disposal or recovery for further use of these dissolved complexes is difficult. Therefore, the use of the oxidation methods of the prior art eliminate the possibility of reusing metals present in liquid waste and also create additional waste elimination problems.

SUMMARY OF THE INVENTION

According to this invention, a process is disclosed which provides for the elimination of the cyanide and recovery of metals from liquids, particularly liquid wastes produced during metal treatment processes. This is accomplished through the use of carefully controlled reaction conditions which avoid the oxidation of the cyanide into carbon dioxide and ammonium. By avoiding the production of ammonium, the dissolved metal in the solution does not form ammonium complexes, but instead precipitates out of solution as a granular metal oxide. This metal oxide can be easily separated from the oxidized reaction liquor, thus allowing for recovery of the metal from the liquid waste.

BRIEF DESCRIPTION OF THE DRAWINGS

The foregoing and other features of the present invention will be more readily apparent from the following detailed description and drawing of the present invention in which:

The figure is a diagram of the apparatus used in the process of the present invention.

DESCRIPTION OF THE PREFERRED EMBODIMENTS

Figure 1:
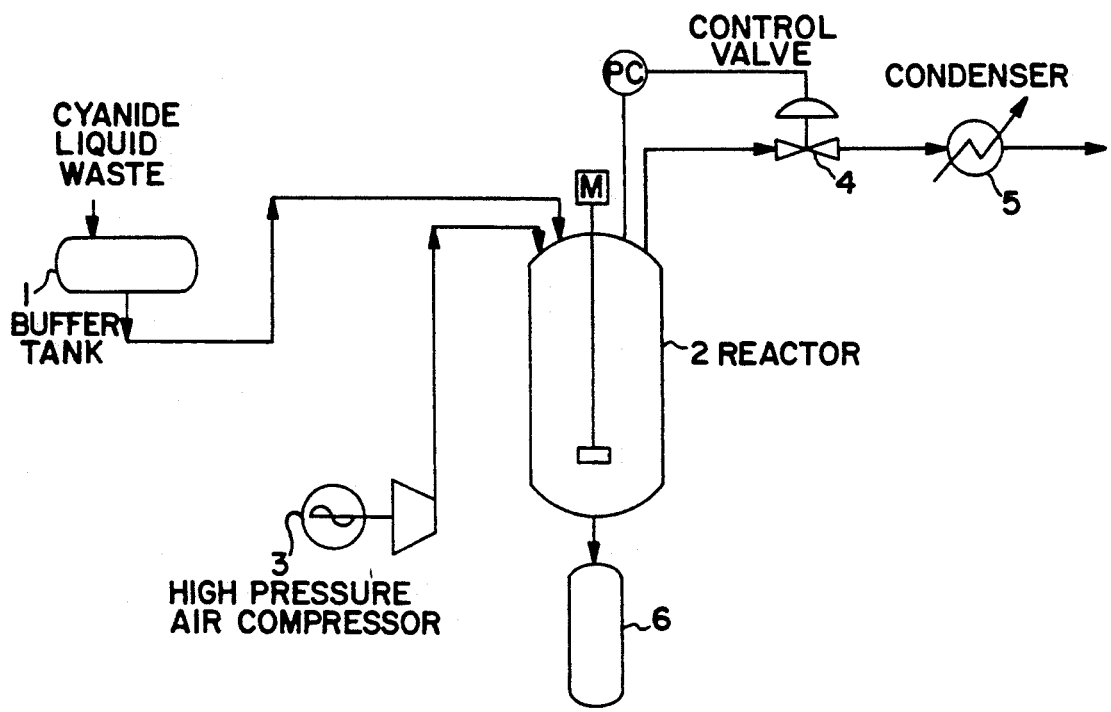

In the process of this invention, as shown in the figure, the cyanide-containing liquid waste is injected into a sealed reactor 2 in a fixed quantity from a buffer tank 1 at ambient conditions. The liquid is then optionally agitated at a speed of about 600 r.p.m. and heated to a temperature appropriate for the oxidation reaction, i.e., within the range of about 240° C. to 255° C. Air is then continuously introduced into the reactor 2 by an air compressor 3 to provide oxidation of the cyanide and to raise the reactor pressure to appropriate operating level, i.e., within the range of about 800 psig to 1200 psig, preferably not exceeding 1200 psig. When the desired reactor pressure is reached, the exhaust gases which contain primarily nitrogen, carbon dioxide, oxygen, and water vapor are discharged through exit control valve 4 into condenser 5 to maintain the pressure at the operating level. The gases which are not condensed are harmless and can be discharged into atmosphere directly from the outlet of condenser 5. After 30 to 90 minutes of maintaining the selected temperature and pressure, the reaction is terminated. Air is no longer provided and the temperature of the oxidized liquor is allowed to fall below 60° C. The reactor pressure is reduced 1 atmosphere, and finally the oxidized liquor is discharged into tank 6. In tank 6, the granular metals settle to the bottom of the tank and can then be readily recovered.

Although a batch process is described above, this process could be easily adapted by one of ordinary skill into a continuous process, utilizing well-known liquid waste treatment techniques.

According to the process of the present invention, the cyanide compounds are converted selectively into carbon dioxide and nitrogen, while the dissolved metal ions present in the liquid are converted into granular metal oxides. The conditions of the process are controlled such that the conversion of the cyanide into carbon dioxide and ammonium is avoided, thus preventing the formation of metal ammonium complexes. As disclosed above, these complexes dissolve in the oxidized liquor and are difficult to dispose of or recover for use. Thus, the process of the present invention avoids the difficulties of the prior art, and advantageously allows the metal ions to be recovered in granular form.

Using the process of the present invention, the recovered granular metal oxides have a predominant particle size of about 100 microns to 500 microns. The oxidized liquor is either suitable for final discharge or is readily biodegradable for further reduction of the chemical oxygen demand (COD).

The liquid wastes especially suitable for treatment by the process of the present invention are spent metal treatment solutions which comprise cyanide. These liquids contain dissolved cyanide, metals, and organic compounds in aqueous solution. Examples of such solutions are metal stripping and cleaning bath solutions where cyanide is used in the finishing process, spent cyanide plating bath solutions, and spent cyanide solutions from heat treating operations.

Metals suitable for recovery from the liquid waste can be generally defined as the transition metals and include copper, nickel, zinc, gold, silver, and any other metal which forms an insoluble granular metal oxide under the process conditions disclosed above.

Gas used in the oxidation process of the present invention must contain oxygen in sufficient quantities to bring about the oxidation reaction. A preferred gas source is air.

The distinction between the process of the present invention and those of the prior art is illustrated by the working and comparative examples below. Conditions which are within the disclosure of the present invention are shown in the Example to result in the simultaneous elimination of the cyanide from the liquid waste and the recovery of a significant portion of the metal ion originally present in the solution. However, conditions not within the guidelines of the present invention, as shown in the Comparative Example, result in the formation of soluble ammonium complexes, which precludes the recovery of the metal ions and presents difficulties in the disposal of the oxidized liquor.

The following working example further illustrate the invention, however, it should be recognized that the scope of the present invention is not restricted to such an example.

EXAMPLE

A 310-liter reactor was charged with 240 liters of a spent stripping bath solutions from an integrated circuit lead manufacturer which contain 55,000 mg/l cyanide, 28,045 mg/l copper, and 79.34 wt % of water with a COD level about 42,329 mg/l. The temperature was elevated to within a range between 245° C. and 253° C. with stirring at a speed of 616 r.p.m. When the temperature reached 245° C., air was continuously introduced into reactor and the pressure increased to about 1150 psig. At that point, the exhaust gases were released through the exit control valve to maintain the pressure between 1140 psig and 1180 psig. The reaction was carried out for about 60 minutes. To terminate the reaction, the inflow air was turned off, the temperature was reduced to below 60° C., the pressure was lowered to one atmosphere, and the entire oxidized liquor was discharged by opening the plunger value at the bottom of the reactor. The discharged solution was separated into aqueous liquor and solid particles, principally, granular cuprous oxide. The aqueous liquor contained 0.43 mg/l cyanide, 11,600 mg/l copper, and 18,574 mg/l of COD. The process therefore resulted in the almost complete elimination of the cyanide, and the conversion of about 59% of the copper metal in the feed into recovered granular cuprous oxide. The cuprous oxide had a predominant particle size from about 100 to 500 microns.

COMPARATIVE EXAMPLE

As in the above Example the reactor was charged with 240 liters of spent stripping bath solution from an integrated circuit lead manufacturer which contained 37,820 mg/l of cyanide and 17,840 mg/l of copper. The temperature was maintained around 263° C., and the pressure was kept near 1270 psig for about 90 minutes. After the reaction was over, the resultant solution contained 0.05 mg/l cyanide indicating the cyanide had been effectively eliminated, however, all the copper ions had reacted with ammonium to form copper ammonium complexes. These complexes dissolved in the aqueous solution, and thus simple recovery or disposal of the copper was not possible.

What is claimed is:

1. A process for the oxidation of a liquid which comprises cyanide and soluble metal ions, said process comprising:
    (1) maintaining said liquid in a reactor at a temperature between about 220° C. and 255° C. and a pressure between 800 psig and 1200 psi,
    (2) continuously introducing an oxygen-containing gas into said reactor for a period sufficient to oxidize said soluble metal ions in said liquid to insoluble metal oxides comprising cuprous oxide, said reaction conditions being selected so as to substantially prevent the formation of ammonium metal complexes,
    (3) discharging the residual liquid and the insoluble metal oxides from said reactor, and
    (4) recovering said insoluble metal oxide from said residual liquid.

2. The process of claim 1 wherein said liquid is circulated throughout the reaction process.

3. A process according to claim 1 wherein said temperature ranges between 240° C. and 250° C.

4. A process according to claim 1 in which said liquid is liquid waste produced during metal treatment processes.

* * * * *